United States Patent Office 3,249,761
Patented May 3, 1966

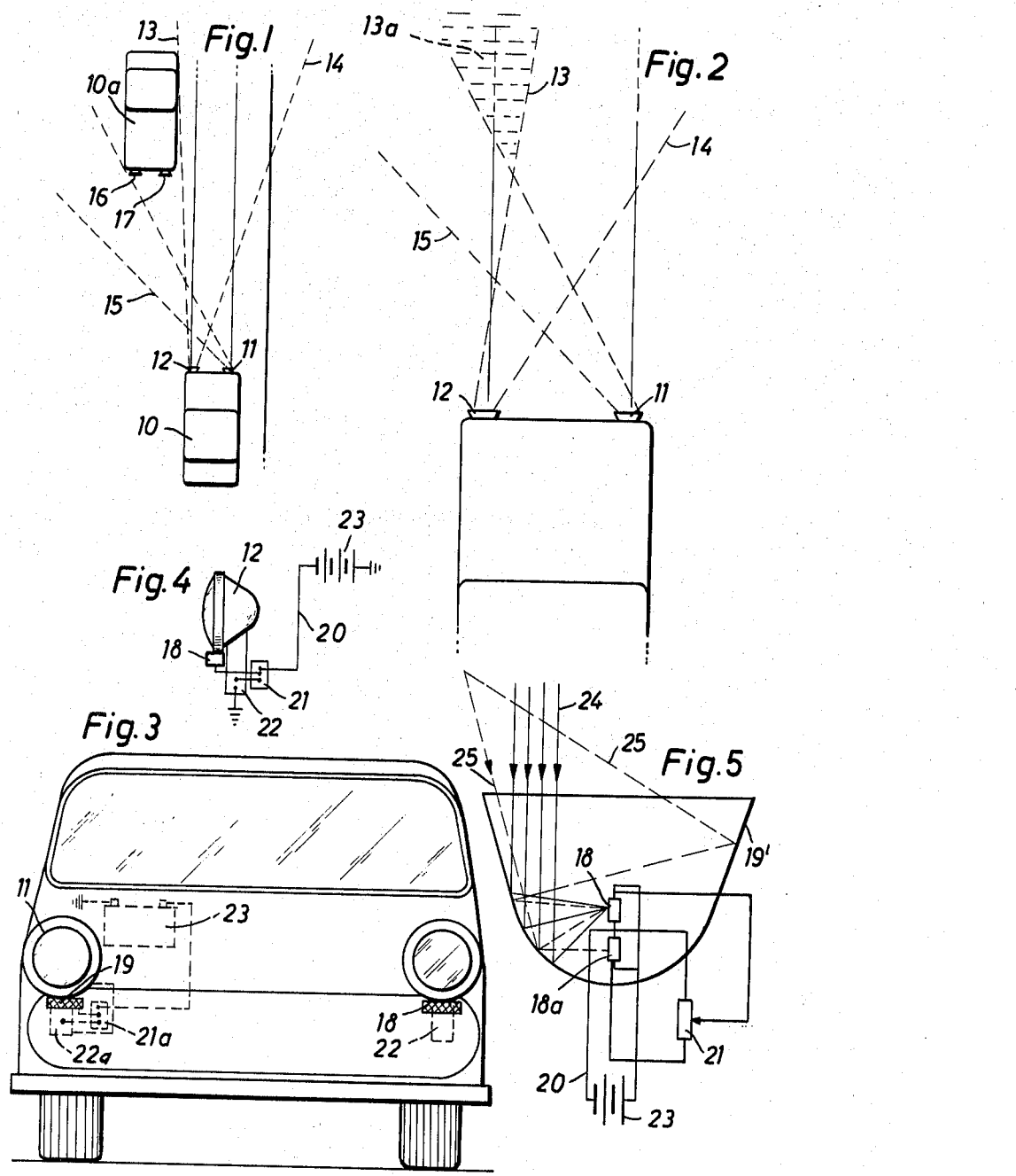

3,249,761
PHOTOELECTRIC HEADLAMP DIMMER WHICH ADJUSTS HEADLAMPS INWARDLY
Herbert Baumanns, 187 Bellastrasse, Rheydt, Germany
Filed Oct. 8, 1962, Ser. No. 228,981
Claims priority, application Germany, Oct. 9, 1961,
B 64,312; Dec. 4, 1961, B 65,024
3 Claims. (Cl. 250—234)

This invention relates to a dimming device for radiation transmitters, more particularly the headlamps of vehicles.

It is known to couple a radiation transmitter, such as a headlamp or an infra-red transmitter or radar transmitter, with a radiation receiver, such as a photocell or an infra-red receiver or the equivalent, in order to control the radiation transmitter, for instance by dipping or the like. Conventionally, the headlamps of motor vehicles or the like are caused to dip by the radiation transmitter being changed over directly to predetermined stages upon the radiation receiver operating. In headlamps of motor vehicles this is done by the undimmed light being changed over to the dimmed light. Once the source of the radiation disappears, the full light can be restored. There are no intermediate stages between fully dipped and fully undipped light.

The invention relates to a further development of the dimming device for radiation transmitters, more particularly headlamps. According to the invention, the radiation receiver so controls its associated radiation transmitter automatically that the change in direction of the beam emitted by the radiation transmitter is effected in dependence of the actual position of the radiation transmitter of the oncoming vehicle. The radiation transmitters, for instance the headlamps, can be pivoted inwards towards the longitudinal centre plane of the vehicle. Advantageously two radiation receivers and two radiation transmitters adapted to control a dark zone segment bounded by the edge rays of the two beams or pencils of radiation are provided. The arrangement may also be such that in the case of a stationary beam of light a dark zone segment within this beam of light is controlled in the manner according to the invention.

The arrangement according to the invention is such that the adjustable radiation transmitter is controlled in dependence upon the instantaneous radiation conditions, for instance light conditions, of an approaching vehicle. The radiation transmitter, i.e., the headlamp, is deflected or moved only to the extent required by prevailing circumstances. This means that the boundary between lightness and darkness is always adapted exactly to the position of the other vehicle. Whether the light emanating from the approaching vehicle is strong or weak, the reaction for controlling the radiation transmitter is initiated solely by the distance between the lights.

Another advantage of this system is that the radiation transmitter, i.e., the headlamp, on one side of the vehicle behaves differently from the headlamp on the other side of the same vehicle in respect of the same light source on an approaching vehicle. The road is therefore lit for each of two vehicles approaching one another without the driver of either vehicle being dazzled. The arrangement according to the invention makes it possible to drive with undipped lights substantially the whole time.

Since the radiation transmitter, for instance a headlamp, of an oncoming vehicle provides considerable scatter radiation which increases in proportion as the distance between the vehicles decreases, while the radiation receiver, for instance the photocell, may be unsatisfactorily affected by scatter radiation of this kind which is incident in a substantially uncontrollable fashion, with the result that the scatter of the radiation transmitter is unsatisfactory, the invention provides also that at least two radiation receivers are associated with a single radiation transmitter, the two receivers being placed at a relatively reduced distance apart from one another and are connected in opposition to one another so that their energising currents or the like flow in opposite directions to one another in an exciting circuit. If two photocells are connected in opposition, two oppositely directed photocurrents flow in a common circuit so that the two photocells are ineffective when such currents are equal to one another. The detrimental scatter component is therefore eliminated and the amount of pivoting of the beam depends mainly upon the non-scatter component, the intensity of which is inversely proportional to the distance between the vehicles.

In one advantageous embodiment of the invention, one of the photocells is associated with a device—such as a concave reflector or a lens or a prism or a lattice—which bunches parallel light rays. In this event the photocells can be arranged with their optically active side perpendicular to the direction of the incident beams. The other photocell is arranged beside or above or below the first photocell. Consequently, the effective scatter radiation is approximately the same for the second or compensating photocell. In this case, the opposite photocurrents are substantially equal and the removal of the effect of scatter radiation on the photocell is a maximum. Advantageously, the photocells or the radiation receiver are selective for the infra-red range and have maximum absorption for the corresponding wavelength. If required, more than one compensating photocell and possibly more than one receiving photocell can be used.

The invention will now be described with reference to the accompanying drawings which illustrate by way of example preferred embodiments thereof, and in which:

FIGURE 1 is a diagrammatic plan view showing two motor vehicles approaching one another, the beams from one vehicle having been pivoted into a non-dazzling position;

FIGURE 2 is a view on an enlarged scale of the dark zone segment associated with inward pivoting of the headlamps shown in FIGURE 1;

FIGURE 3 is an end view of a motor vehicle showing the control circuit;

FIGURE 4 is a side view of part of the control circuit, and

FIGURE 5 illustrates diagrammatically two photocells connected in a compensating circuit arrangement and disposed in a concave reflector.

FIGURE 1 illustrates two vehicles 10, 10a which are approaching one another. The first vehicle 10 has headlamps 11, 12 and the second vehicle has headlamps 16, 17 which can, if required, provide the parking light as well as the dipped and undipped main light. In order that the vehicle 10a may not be dazzled, the beams 14, 15 are pivoted inwards, as can be seen in FIGURES 1 and 2, so that a dark zone is produced towards the vehicle 10a. The dark zone is in the shape of a segment 13, FIGURE 1, the size of which depends upon how far the beams of the headlamps 11, 12 are inclined inwards, since such beams bound the segment 13. The same becomes wider in proportion as the beams 14, 15 are pivoted further inwards to their respective right and left hand directions. FIGURES 1 and 2 show that the beam 15 from the headlamp 11 of the vehicle 10 passes the vehicle 10a without dazzling the driver whereas the beam 14 from the right-hand headlamp 12 of the vehicle 10 provides a strong illumination of the right-hand side of the road, i.e., that side of the road which is important for the driver of the vehicle 10.

Referring now to FIGURES 3 and 4, the vehicle 10 has at least one and preferably two photocells 18, 19 so that one photocell is available for each haedlamp 11 and 12. The photocells are adapted to be adjusted, more particularly by rotation. Accordingly, each photocell can be disposed on a pivot secured in friction bearings. A voltage derived from the vehicle battery or vehicle dynamo is applied, possibly with amplification, to the photocell. As shown in FIGURE 4, the photocell 18 is connected through a line to an amplifier 21 which amplifies the photocurrent and delivers the amplified output to an actuating device, such as a miniature electric motor 22. The reflector or casing of the headlamp 12 is pivoted or inclined to the left or right as required, for instance through the agency of gearing. Alternatively, the actuating device, for instance a motor 22, can adjust a mask which can be disposed inside or outside the headlamp casing. The mask can be in the form of a louvre or it can be a sheet-metal cap near the headlamp bulb or the like and can act by so varying the initial light distribution, i.e., the light distribution before the light impinges upon the internal reflector, that only the beams or pencils 14, 15 are formed. If required, the incandescent lamps or filaments or the like can be received in an adjustable base and the adjusting motor or the like 22 can be used to so vary the position of the base and therefore of the bulb relatively to the headlamp reflector that the required lateral beams are produced. The latter embodiments are preferable for headlamps already fitted to the vehicle, and it is preferable to adjust the whole headlamp casing in the case of headlamps fitted subsequently to the vehicle.

The invention is not limited to the foregoing. In motor vehicles where a hydraulic brake system is provided, and more particularly in motor vehicles where hydraulic or air-hydraulic systems of springing are used, and hydraulic main reservoirs which can supply a pressure fluid are therefore available, the photocurrent can be used, with or without amplification, to operate a relay which closes or opens a valve or a diaphragm, so that a hydraulic circuit is closed or opened and actuates some form of appropriate actuator, not necessarily a motor, to adjust the headlamp light or the reflector or the mask or the equivalent. The adjustment can be performed through the agency of a reversible hydraulic piston, the hydraulic circuit acting upon one side of the cylinder in which the piston moves. A similar kind of arrangement can be used in vehicles fitted with air brakes, the air being conveyed through lines connected to a main air reservoir. If required, actuation can be mechanical, the relay which is operated by the photocurrent being operative on an arrangement comprising adjusting springs and opposing springs. Thermal actuation is also possible, in which event the amplified photocurrent is used to heat a heating wire having a high ohmic resistance, the heat evolved being used to operate a bimetallic relay. The movement thereof produces the required change in the headlamp.

A separating adjusting mechanism, for instance separate adjusting motors 22, 22a, can if required be provided for each headlamp 11, 12 and separate amplifiers 21, 21a can be used. In this case all the elements required to actuate a headlamp can be mounted together on a projection or small panel or the like and provided with a single dustproof hood. Where the actuating devices are relatively powerful, only a single adjusting motor or the like need be provided which is coupled through a flexible rotating shaft with the other headlamp so that the two light beams are adjusted synchronously. The reversal of direction required for the other headlamp can be produced by an intermediate element, such as a gear.

It will be apparent from the drawings hereinbefore referred to that a beam of light emitted by the approaching vehicle 10a has a double action on the other vehicle 10, viz. an intensity-dependent action at first, followed by an action depending upon the angle at which the beam is incident upon the photocell 18 or 19. If the vehicle 10a is relatively far away, the intensity is so slight that the photocurrent is negligible and the headlamps 11, 12 of the first vehicle 10 are not altered. As the vehicles approach one another and the light reaching the light cell becomes stronger, the photocircuit is closed and the beams from the headlamps 11, 12 are adjusted slightly inwards. The control is arranged so that the pivoting of the beams at the headlamps 11 and 12 is substantially proportional to the light incident at the photocells. As the distance between the vehicles decreases, the dazzling beam 15 is pivoted further inwards so that the beam 15, as it were, rotates away from a position in front of the vehicle 10a and provides a useful illumination of the road in front of the vehicle 10a but without dazzling the driver thereof. When the headlamps 16, 17 have come so near the vehicle 10 that, because of the inclination of the headlamps 16, 17 relatively to the photocells 18, 19 this light is not received thereby, the photocurrent decreases, with the result that the beams 14, 15 pivot outwards slightly towards their normal position. This return pivoting movement mainly occurs either when, or very shortly before, the vehicles pass one another. Since the photocells can be actuated with very little inertia and the beam can also be adjusted with very little inertia and rapidly, the zone 13a is illuminated brightly once the vehicles have passed one another and no dark gap is produced. For the rest, and as FIGURE 1 shows, there is a considerable and constant illumination of the right-hand side of the road.

The invention is of use in illuminating a dark zone segment 13 in width or depth. If required, the automatic beam adjustment system can be used to control an extra headlamp or the beam thereof. In such a case an extra headlamp is provided (not shown). Associated with it are a photocell and the other control elements required for the headlamps 11, 12. The extra photocell receives the light from an oncoming vehicle, and the resulting photocurrent so controls an actuating element, such as an adjusting motor, that the beam from the extra headlamp is raised or inclined. The control characteristics are chosen so that the extra headlamp, which can be switched off manually, is on full beam when the light coming towards it is weak but produces a vertical downwards beam when the approaching light increases in intensity, the amount of inclination being such that the extra headlamp provides good illumination of the road at the level of the oncoming vehicle. As the same comes nearer, the beam continues to be inclined so that the road in the immediate vicinity of the oncoming vehicle remains constantly illuminated. Once the oncoming vehicle has passed the first vehicle, the photocell of the extra headlamp receives substantially no light so that the headlamp returns to full beam or can be switched off by hand. One advantage of this system is that the driver of the first vehicle can see whether there are any people on the road near the oncoming vehicle who take the opportunity, after the oncoming vehicle has passed by, to cross the road immediately behind the last-mentioned vehicle.

When the vehicles 10 and 10a are relatively far apart from one another, the parallel incident component can be considered as sharply beamed but of reduced intensity. In the arrangement illustrated in FIGURE 5, incident light is received by two adjacent photocells, a control photcell 18 and a compensating photocell 18a. Conveniently, photocell sensitivity is increased by some auxiliary optical device such as, for instance, a concave reflector 19', the control photocell 18 being placed at the focus thereof while the compensating photocell 18a is placed beside the focus. The parallel light is incident in the reflector 19' when the vehicles are relatively far apart from one another and is mostly reflected merely to the control photocell 18 at the focus of the reflector. A current which depends upon the intensity of this parallel constituent 24 is supplied through a control element, such as an ohmic resistor 26, to a motor or the like which adjusts the reflector or the like of the headlamp correspondingly. As will be apparent from FIGURE 5, in this position the compensating photocell 18a receives substantially no light. The two photocells are connected in opposition to one another as indicated by the circuit shown; consequently only the photocurrent of the cell 18 is operative on the unit 26 since the cell 18a delivers no opposing current. In this position the scatter components reaching the cells 18 and 18a are so small as to be negligible.

However, when the vehicles have come much closer together, the proportion of scatter radiation increases, as indicated by a light pencil or beam 25. The scatter radiation is now incident on the photocells and the reflector 19' at a variety of angles, so that the photocell 18 ceases in practice to be at the focus of scatter beams. The scatter component is also of high intensity and overlaps the radiation component theoretically available to pivot the light beams, so that the photocell 18 delivers a photocurrent of uncontrollable magnitude. Many other factors, such as the lateral distance between the vehicles and so on, must also be considered. The beams 14, 15 are therefore pivoted wrongly. If, however, the compensating photocell 18a is, in accordance with the invention, disposed at a short distance from the photocell 18 or immediately adjacent the same, the scatter radiation is incident upon the two photocells 18 and 18a at substantially the same intensity. The compensating photocell 18a produces a current which is substantially the same as the current produced by the control photocell 18 but which is oppositely directed to the last-mentioned current, so that the disturbing scatter component can be effectively compensated for in the resistance 26. A Poggendorf compensating circuit can be used to compensate the photocells, which can be regarded as voltage sources.

In one advantageous embodiment of the invention, and as can be seen in FIGURE 5, the photocells have their narrow sides towards the oncoming vehicle and their wide sides towards the auxiliary optical device 19'. Instead of the device 19' or in combination with other auxiliary optical devices, lenses can be used, such as single or double condenser lenses, the control photocell 18 being disposed at the focus of such lenses. The optical device can have corresponding mechanical diaphragms which may or may not be adjustable. One or more prisms or lattices for aligning the beams can be used, more particularly where it is required to control the headlamp in dependence upon a monochromatic radiation or where a particular wavelength range is required to provide the control. Alternatively, wavelength filters can be provided in the path of the beam.

The subject matter of the invention, although described with reference to motor vehicle headlamps, is of use in transport with all other vehicles, such as boats and ships and ferries or the like, and is in principle also of use in aircrafts where air traffic is heavy. The system according to the invention of radiation transmitters and radiation receivers can be used between aircrafts and signal towers. The arrangement can also operate with infra-red radiation, radar radiation or the like as well as with visible light.

I claim:
1. A headlight control system for use on two spaced headlamps of a controlled motor vehicle when meeting other oncoming vehicles on a roadway having headlamps radiating energy toward the controlled motor vehicle comprising in combination, a photocell array positioned on the controlled vehicle for receiving said energy from an oncoming vehicle, and headlamp position control means responsive to the photocell array for automatically pivoting the two spaced headlamps inwardly over a range of adjustment proportional to the intensity of the energy received from the headlamps of the oncoming vehicle to an extent pointing one headlamp beam off the roadway creating a dark zone segment which follows the position of the oncoming vehicle and retaining illumination from one headlamp along the side of the roadway upon which the controlled vehicle is passing.

2. A headlight control system as defined in claim 1 wherein the photocell array is positioned to pivot with at least one of the two spaced headlamps.

3. A headlight control system as defined in claim 1 with an optical headlamp reflector on the controlled vehicle having a focus position, wherein the photocell array comprises two photocells disposed within the optical reflector, one at the focus position and one outside the focus position, and said two photocells are connected in a circuit to produce current flow in opposite directions, the headlamp position control means being responsive to the combined current flows of the two photocells.

References Cited by the Examiner

UNITED STATES PATENTS

| 1,584,006 | 4/1926 | Blackburn et al. | 240—61.9 |
| 1,611,267 | 12/1926 | Case | 240—61.9 |
| 1,877,279 | 9/1932 | Dawson | 250—209 |
| 2,423,278 | 7/1947 | Willis | 315—82 |
| 2,753,487 | 7/1956 | Bone | 315—83.1 |
| 2,807,752 | 9/1957 | McIlvaine | 315—83.1 |
| 2,896,089 | 7/1959 | Hurley | 250—315 |
| 2,921,757 | 1/1960 | Houle | 250—209 X |
| 2,931,944 | 4/1960 | Admiraal | 315—82 |
| 2,982,859 | 5/1961 | Steinbreacher | 250—205 |
| 3,079,529 | 2/1963 | Novinger | 315—82 |

RALPH G. NILSON, *Primary Examiner.*

ARCHIE R. BORCHELT, *Examiner.*

ELROY STRICKLAND, *Assistant Examiner.*